US009124077B2

(12) United States Patent  
Robinson et al.

(10) Patent No.: US 9,124,077 B2  
(45) Date of Patent: Sep. 1, 2015

(54) METER SOCKET AND LOAD CENTER COMBINATION APPARATUS, ELECTRICAL DISTRIBUTION SYSTEMS, AND METHODS OF ASSEMBLY

(71) Applicant: Siemens Industry, Inc., Alpharetta, GA (US)

(72) Inventors: Kristopher Scott Robinson, Atlanta, GA (US); Jeffrey Kenton Hudgins, Jr., Gainesville, GA (US); Arthur Kevin Shumate, Duluth, GA (US); Brian J. Rusch, Suwanee, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 411 days.

(21) Appl. No.: 13/646,316

(22) Filed: Oct. 5, 2012

(65) Prior Publication Data  
US 2014/0099820 A1 Apr. 10, 2014

(51) Int. Cl.  
*H02B 1/00* (2006.01)  
*H02B 1/03* (2006.01)

(52) U.S. Cl.  
CPC .............. *H02B 1/03* (2013.01); *Y10T 29/49117* (2015.01)

(58) Field of Classification Search  
USPC ................... 361/659–669, 820–832; 439/517  
See application file for complete search history.

(56) References Cited

U.S. PATENT DOCUMENTS

| | | | |
|---|---|---|---|
| 3,012,218 A | 12/1961 | Cataldo | |
| 3,104,276 A | 9/1963 | Cataldo | |
| 3,183,298 A | 5/1965 | Weimer | |
| 3,707,653 A * | 12/1972 | Coffey et al. | 361/622 |
| 3,786,394 A | 1/1974 | Koenig | |
| 3,909,098 A | 9/1975 | Reed | |
| 4,369,484 A * | 1/1983 | Fugate et al. | 361/624 |
| 5,404,266 A * | 4/1995 | Orchard et al. | 361/667 |
| 5,414,590 A * | 5/1995 | Tajali | 361/669 |
| 5,466,889 A | 11/1995 | Faulkner | |
| 5,936,834 A * | 8/1999 | Polston et al. | 361/664 |
| 6,920,038 B2 * | 7/2005 | Gehlbach | 361/648 |
| 7,559,793 B1 | 7/2009 | Zhang | |
| 2009/0207559 A1 * | 8/2009 | Zhang | 361/679.01 |
| 2011/0083872 A1 | 4/2011 | Zhang | |

* cited by examiner

Primary Examiner — Tuan T Dinh

(57) ABSTRACT

A meter socket, load center combination apparatus is disclosed. The meter socket, load center combination apparatus has an enclosure having a meter socket section with a meter socket configured to receive a utility meter, a load center section having a panelboard with a plurality of locations configured to receive circuit interface devices, and a cross-bus connection section extending between first and second sides of the enclosure, the cross bus connection section having one or more side openings configured to allow electrical connection to one or more cross bus bars, and a main circuit breaker coupled between the panelboard and the meter socket. Methods of assembling power distribution systems and electrical distribution systems including the meter socket, load center combination apparatus are disclosed, as are other aspects.

19 Claims, 12 Drawing Sheets

METER SOCKET AND LOAD CENTER COMBINATION APPARATUS, ELECTRICAL DISTRIBUTION SYSTEMS, AND METHODS OF ASSEMBLY

FIELD

The present invention relates generally to meter socket and load center combinations, and systems and methods for power distribution.

BACKGROUND

Meter socket and distribution panel combinations include a meter socket configured to receive a utility meter, and a distribution center adapted to contain one or more circuit breakers in a single enclosure unit. For example, conventional meter socket distribution panel combinations may include 8, 16, 20, 24, 30, or more circuit breaker connection locations. Meter socket and distribution panel combinations may be arranged in a configurations where a meter socket is positioned above distribution panel, or configurations where the meter socket and distribution panel are arranged in a side-by-side configuration. Conventional meter socket and distribution panel combinations must be hard wired when electrically connecting to other panel boxes and sub-panel boxes. Such hard wiring is time consuming and expensive as it adds labor costs for the installation thereof.

Therefore, there is a need for improvements to meter socket and distribution panel combinations.

SUMMARY

According to a first aspect, a meter socket, load center combination apparatus is provided. The meter socket, load center combination apparatus includes an enclosure having a back side, first side, and a second side; a meter socket section having a meter socket configured to receive a utility meter; a load center section having a panelboard with a plurality of locations configured to receive circuit interface devices; a cross-bus connection section extending between the first and second sides and located between the meter socket section and the load center section, the cross bus connection section having one or more side openings configured allow electrical connection to the one or more cross bus bars, and a main circuit breaker coupled between the panelboard and the meter socket.

According to another aspect, an electrical distribution system is provided. The electrical distribution system includes a meter socket, load center combination apparatus having an enclosure having a back side, first side, and a second side, a meter socket section having a meter socket configured to receive a utility meter, a load center section having a panelboard with a plurality of locations configured to receive one or more circuit interface devices, a cross-bus connection section extending between the first side and the second side, the cross bus connection section having one or more side openings, and containing one or more first cross bus bars, and a second panel apparatus having one or more second side openings and containing one or more second cross bus bars wherein the one or more first cross bus bars connect to the one or more second cross bus bars through the one or more side openings of the cross bus connection section and the one or more second side openings of the second panel apparatus.

According to yet another aspect, an improved method of assembling a power distribution system is provided. The method of assembling a power distribution system includes providing a meter socket, load center combination apparatus having a first enclosure having a first side and a second side, a meter socket section in the first enclosure having a meter socket configured to receive a utility meter, a load center section in the enclosure having a panelboard with a plurality of locations configured to receive one or more circuit interface devices, a cross bus connection section extending between the first side and the second side, the cross bus connection section having one or more side openings, and containing one or more first cross bus bars, and a main circuit breaker coupled between the meter socket and the panelboard; providing a second panel apparatus directly adjacent to the first enclosure having one or more second side openings and containing one or more second cross bus bars; and connecting the one or more first cross bus bars to the one or more second cross bus bars through the one or more side openings and the one or more second side openings of the second panel apparatus.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the substance and scope of the present invention. Accordingly, the drawings and descriptions are to be regarded as illustrative in nature, and not as restrictive. The drawings are not necessarily drawn to scale. The invention covers all modifications, equivalents, and alternatives falling within the substance and scope of the invention.

DESCRIPTION

Reference will now be made in detail to the example embodiments of this disclosure, examples of which are illustrated in the accompanying drawings. Wherever possible, the same reference numbers will be used throughout the drawings to refer to the same or like parts.

Figures 1A, 1B:
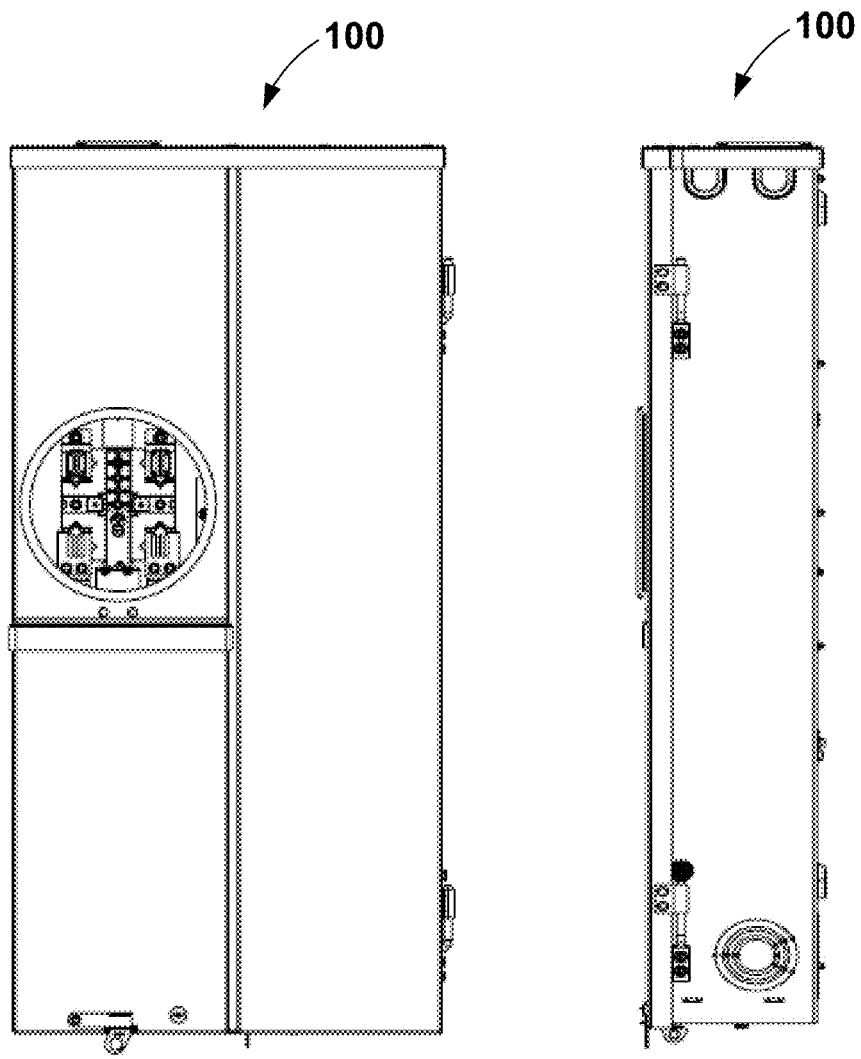
FIG. 1A illustrates a front plan view of a meter socket, load center combination apparatus having a side-by-side configuration according to the prior art.
FIG. 1B illustrates a side plan view of a meter socket, load center combination apparatus according to the prior art.
Figure 1C:
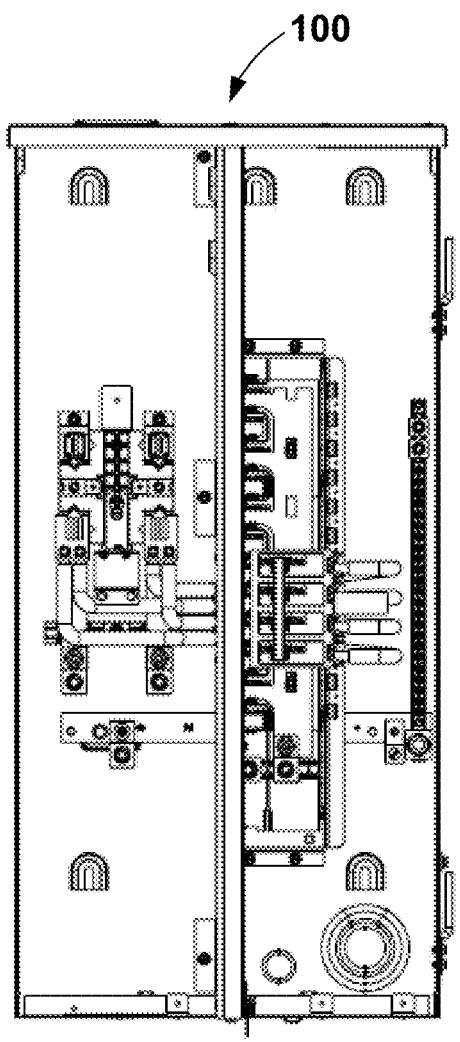
FIG. 1C illustrates a front plan view of a meter socket, load center combination apparatus having a side-by-side configuration with the cover removed according to the prior art.
Figure 1D:
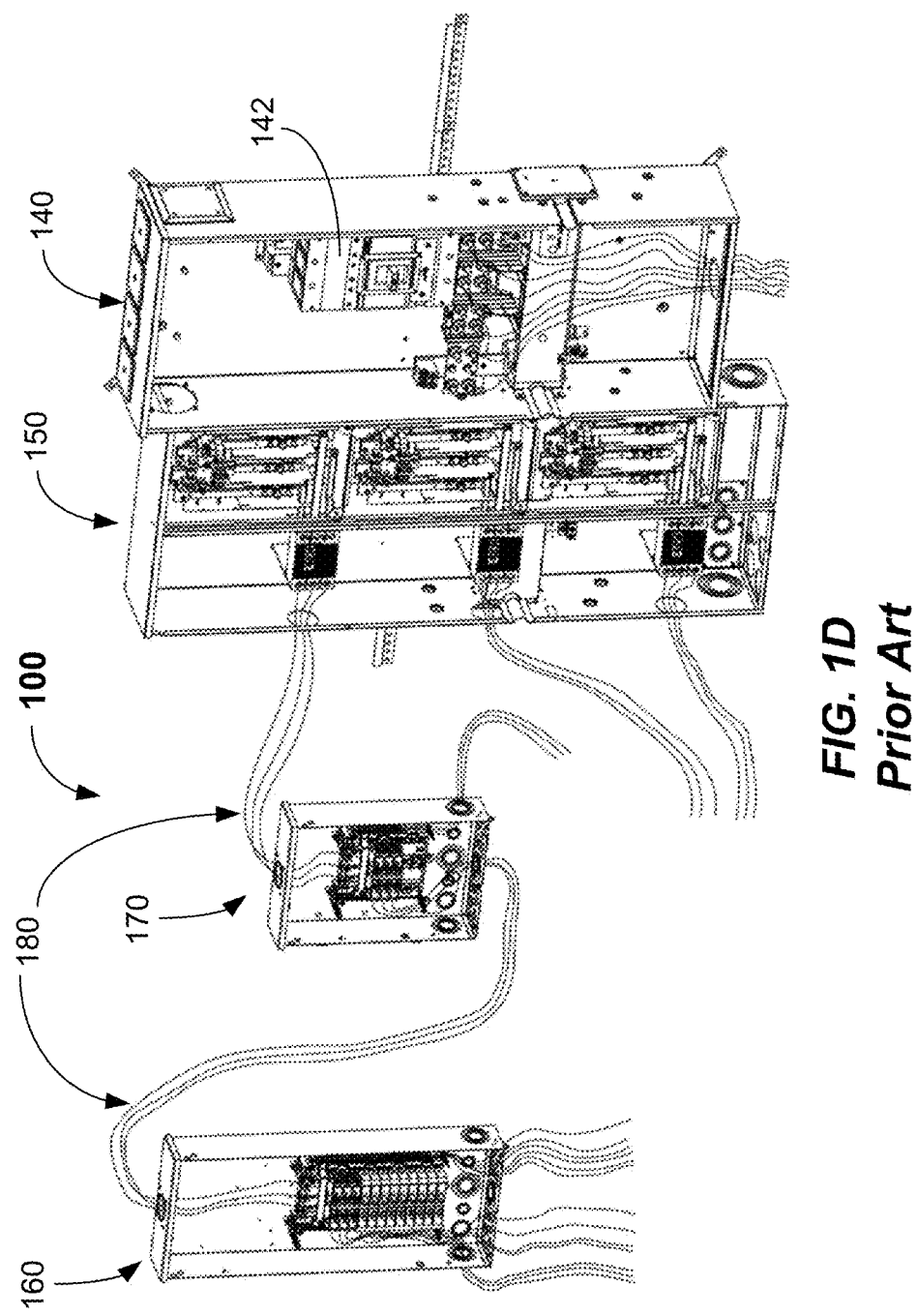
FIG. 1D illustrates a front isometric view of an electrical distribution system according to the prior art.

Existing conventional electrical distribution systems 100, as shown in FIG. 1D, for providing electrical power distribution to multiple dwelling units involved using a separate circuit breaker main enclosure 140 for housing a main service circuit breaker 142, individual meter socket units that are housed a meter stack panel 150, and a separate load center 160 including circuit breakers for protected branch electrical circuits for an individual dwelling unit. In some systems, a subpanel 170 may be provided. All of the panels 160 and 170 are wired together using conventional wired connections 180.

The aforementioned problems of electrical power distribution systems are overcome by embodiments of the present invention. In particular, the inventive meter socket, load center combination apparatus includes an enclosure having a meter socket section configured to receive a utility meter, a load center section having a panelboard with a plurality of locations configured to receive circuit interface devices, and a cross bus connection section located between the meter socket section compartment and the load center section compartment, the cross bus connection section having one or more side openings configured to receive one or more cross buses, and a main circuit breaker.

One or more embodiments allow electrical connection to a main circuit breaker unit or other meter socket load center combination without any hard wiring. Accordingly, the invention provides a compact electric power distribution system enabling electrical connections to a utility power source without using external wiring, conduits, and such labor required to install conventional configurations. The invention will be explained in greater detail with reference to FIGS. 2A-4 below.

Figure 2A:
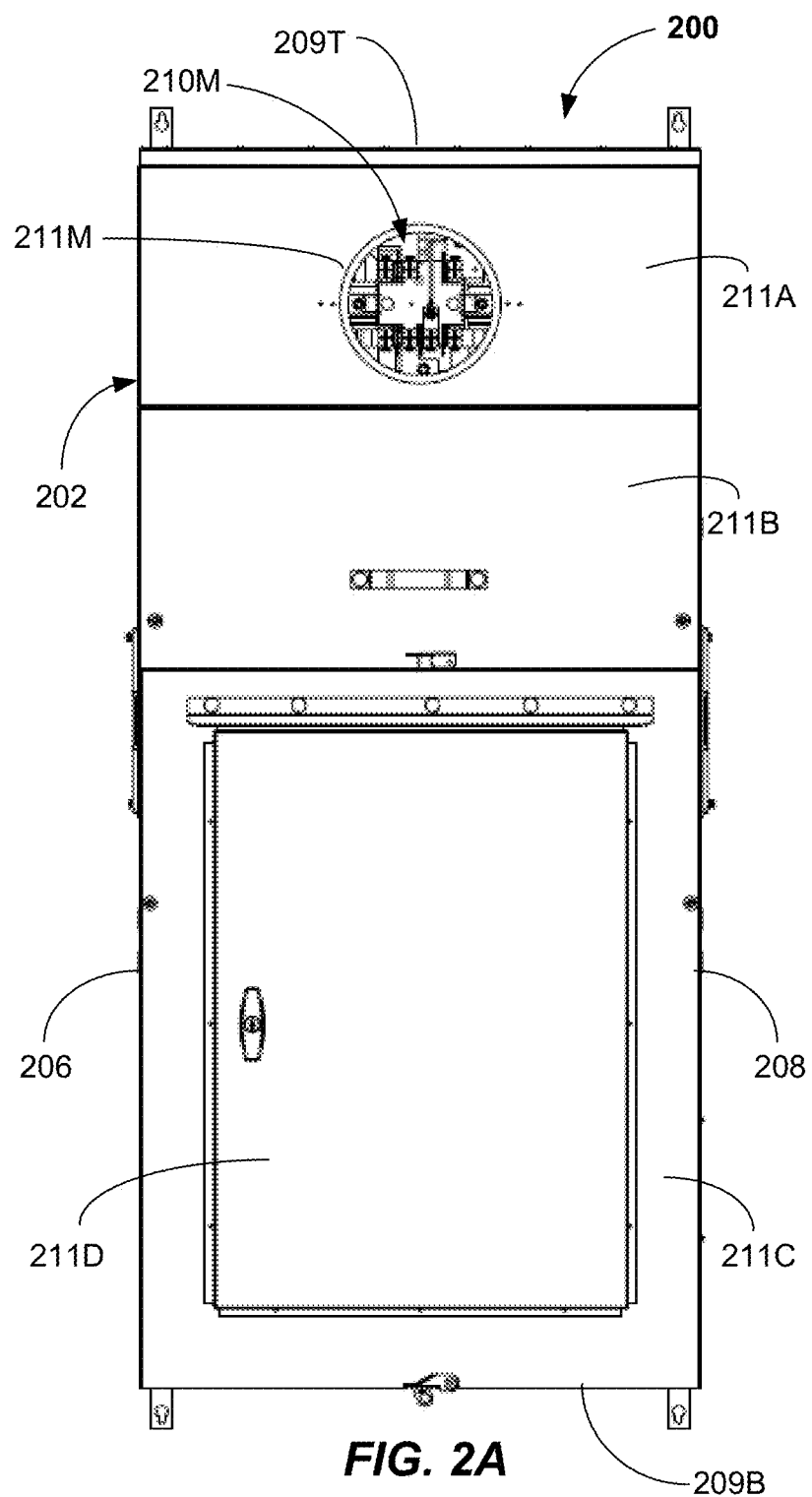
FIG. 2A illustrates a front plan view of a meter socket, load center combination apparatus according to embodiments.
Figures 2B, 2C:
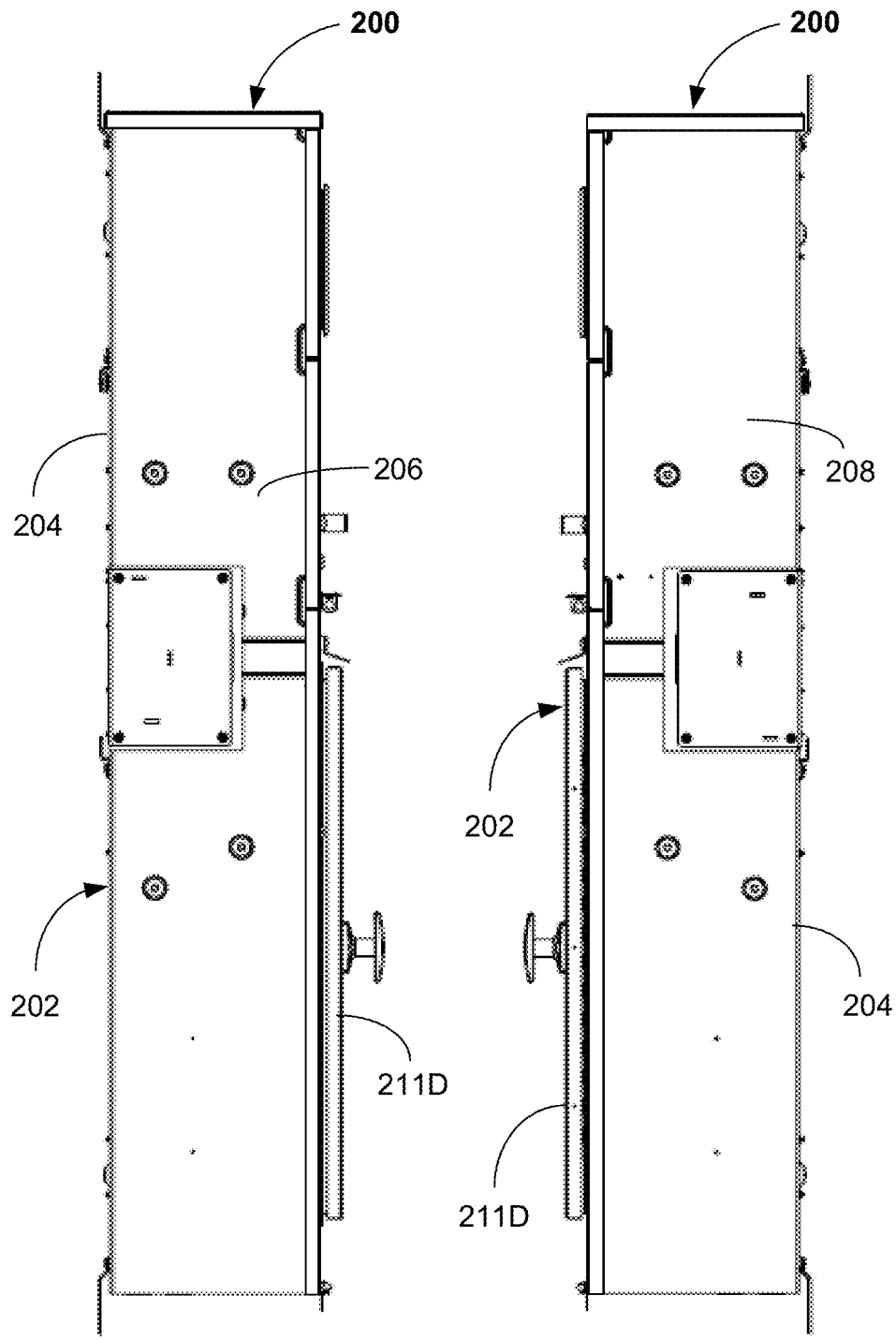
FIG. 2B illustrates a left side plan view of a meter socket, load center combination apparatus according to embodiments.
FIG. 2C illustrates a right side plan view of a meter socket, load center combination apparatus according to embodiments.
Figure 2D:
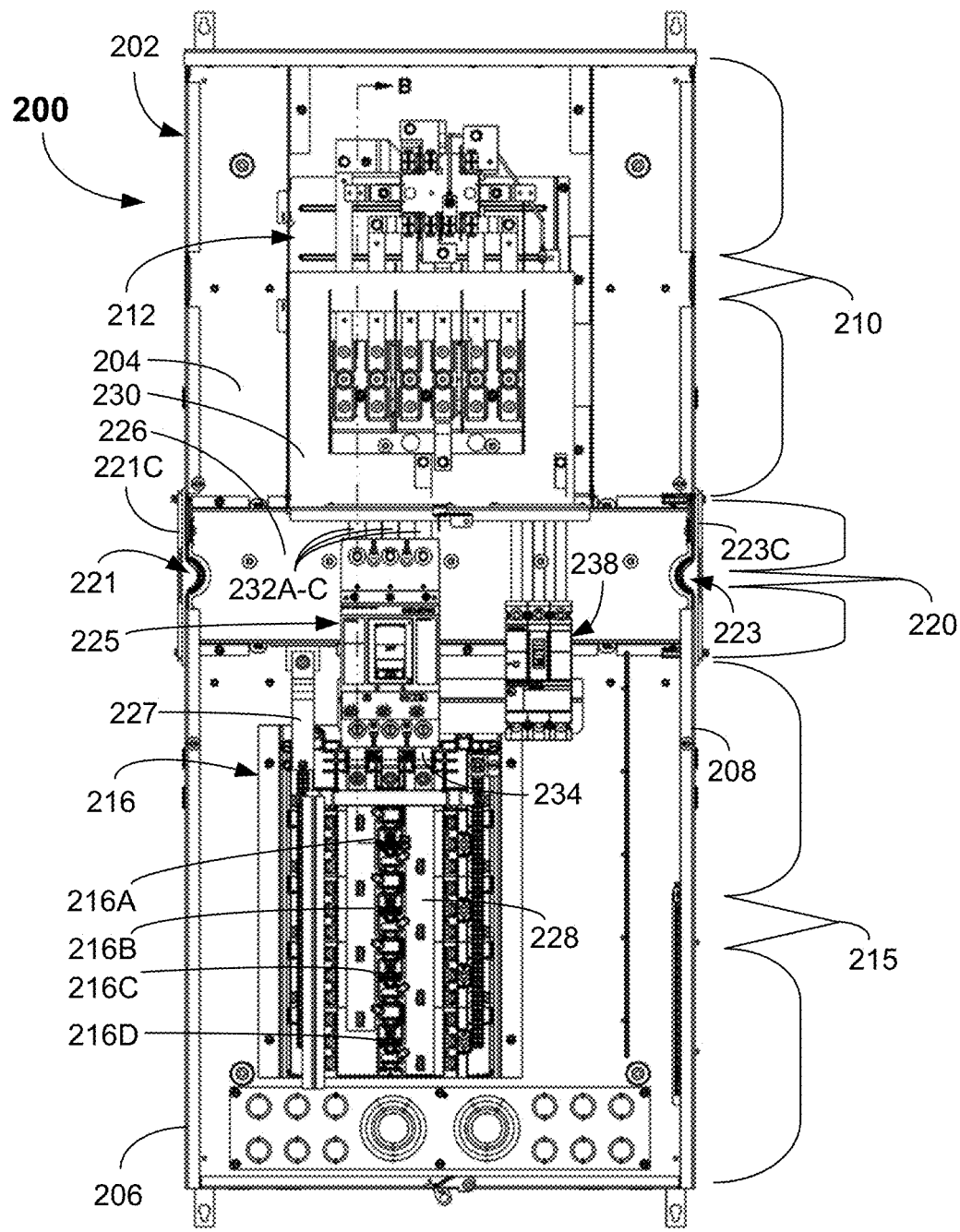
FIG. 2D illustrates a front plan view with covers removed of a meter socket, load center combination apparatus according to embodiments.
Figure 2E:
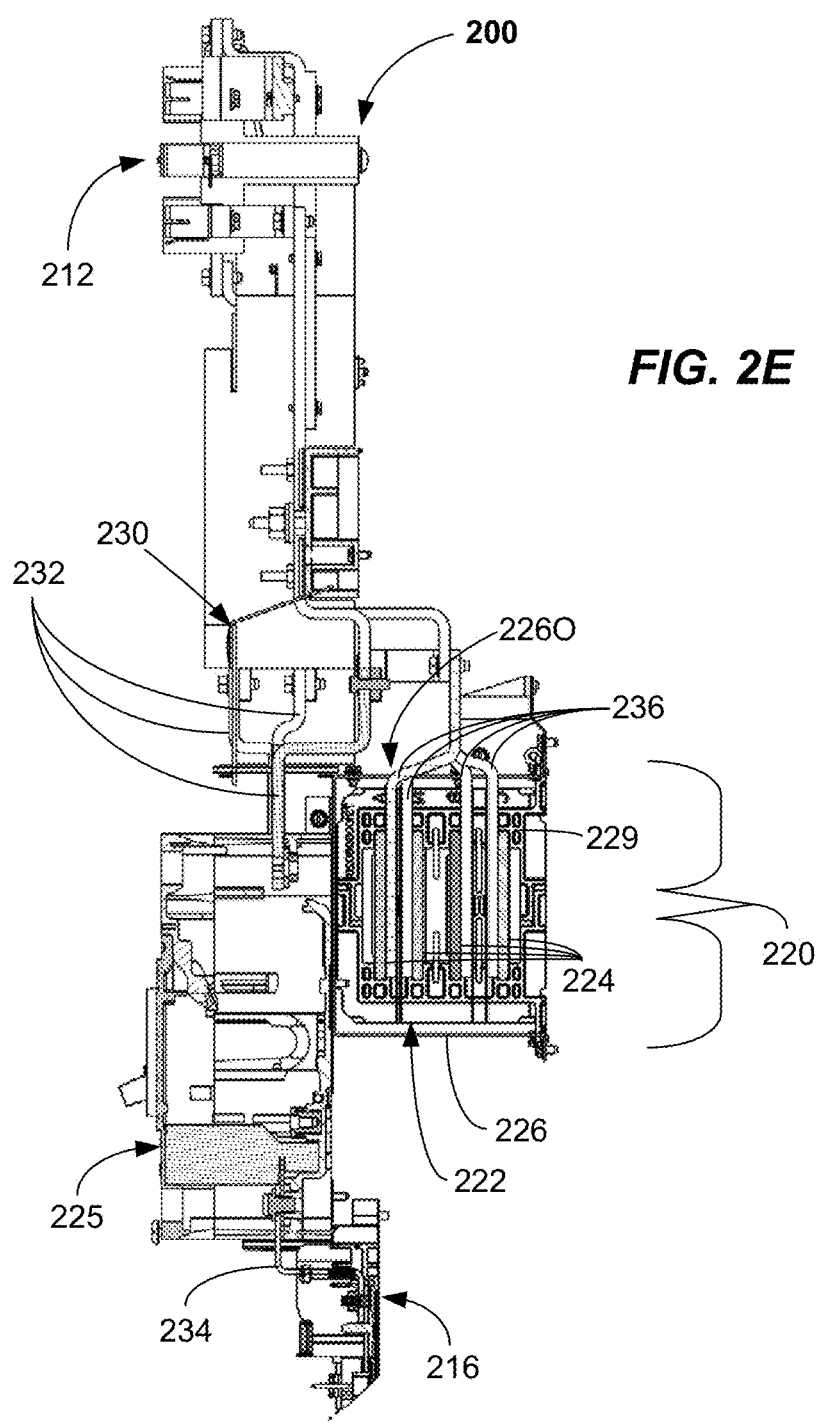
FIG. 2E illustrates a partial cross-sectioned side view of a meter socket, load center combination apparatus according to embodiments.
Figures 2F, 2G:
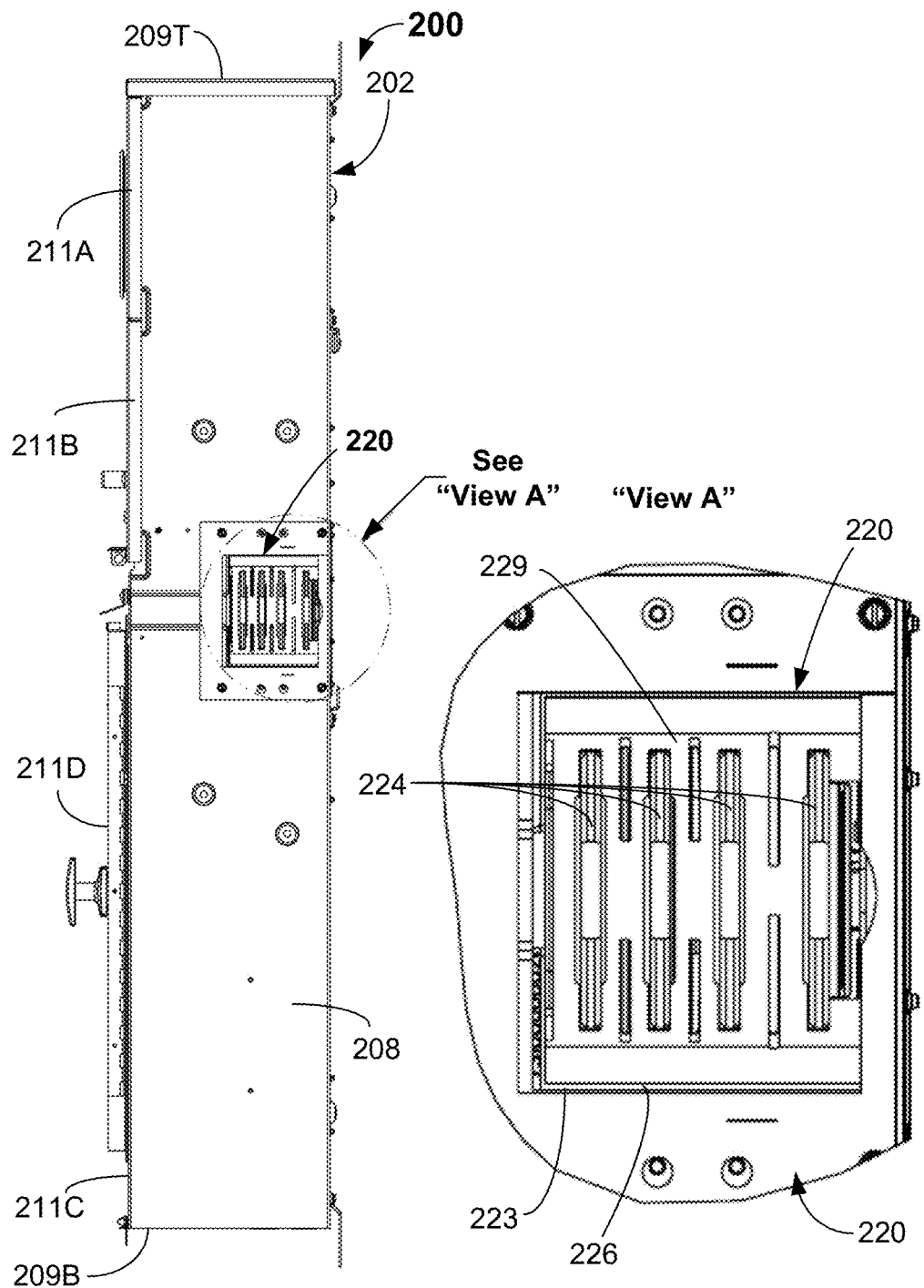
FIG. 2F illustrates a right side plan view of a meter socket, load center combination apparatus with the opening cover removed illustrating the cross bus connection section according to embodiments.
FIG. 2G illustrates an enlarged plan view of a cross bus connection section of a meter socket, load center combination apparatus according to embodiments.
Figure 2H:
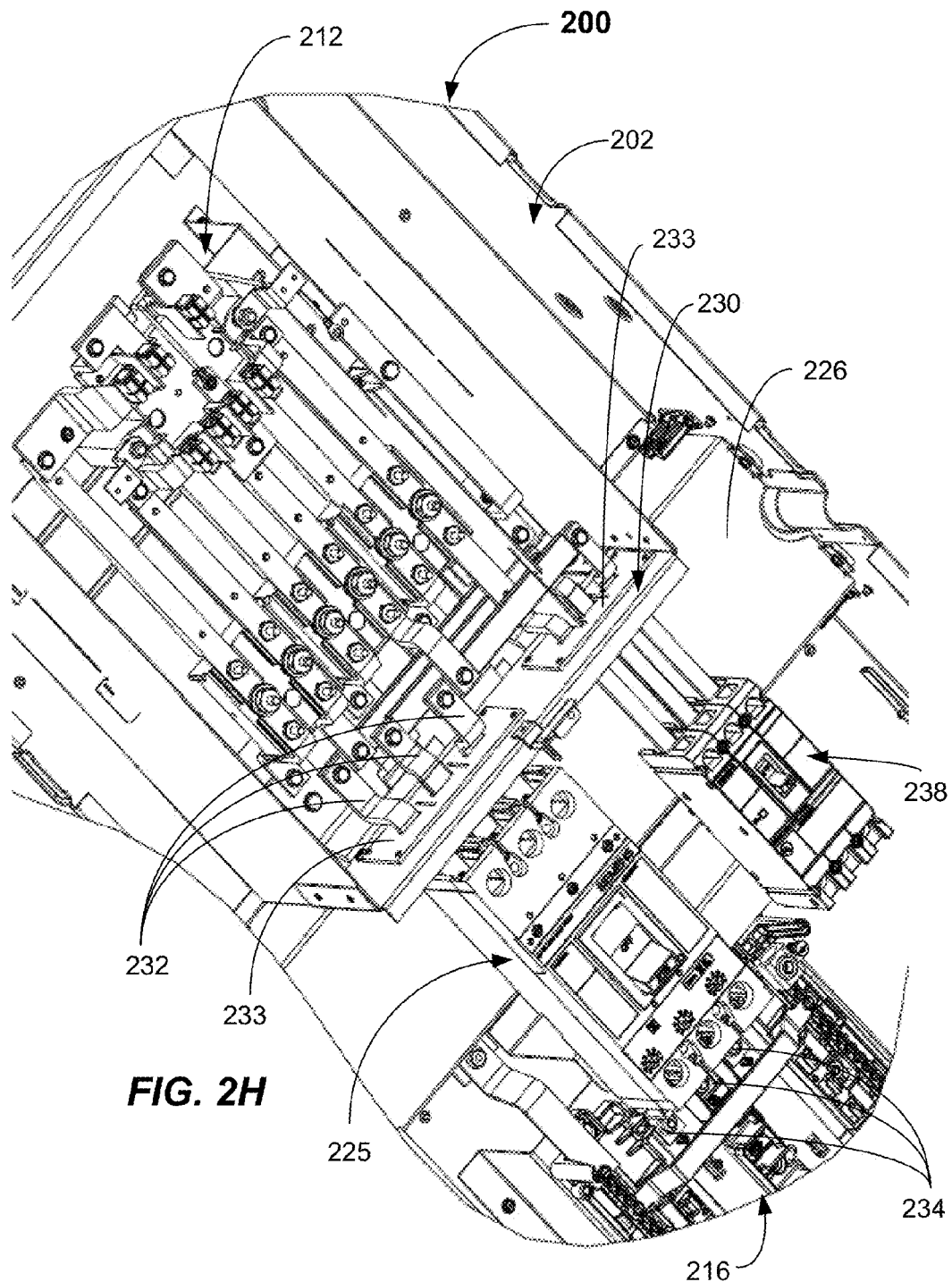
FIG. 2H illustrates an isometric view of shields and cross bus housing of a meter socket, load center combination apparatus according to embodiments.
Figure 3A:
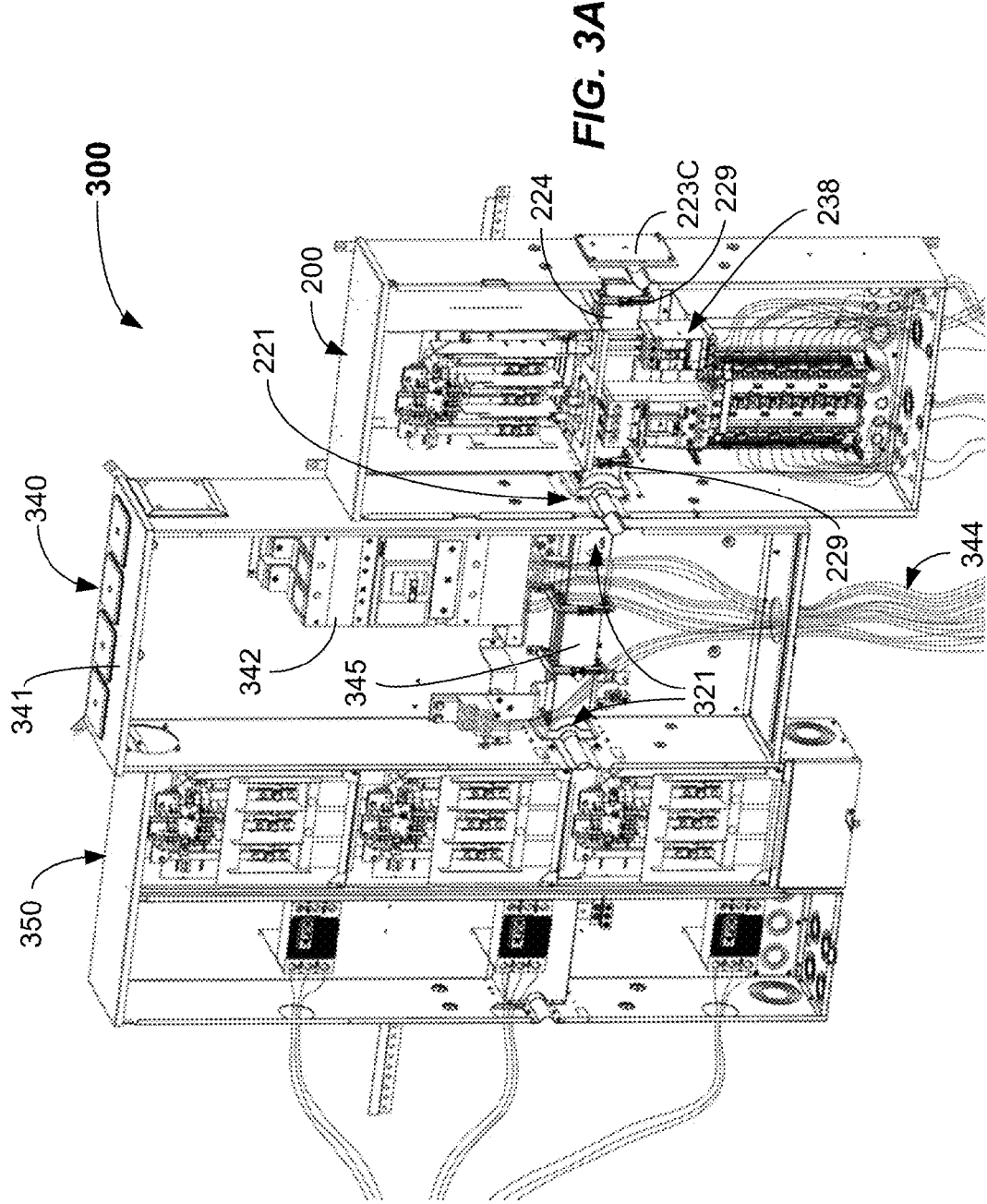
FIG. 3A illustrates a front isometric view of an electrical distribution system, with covers removed, having a meter socket, load center combination apparatus according to embodiments.
Figure 3B:
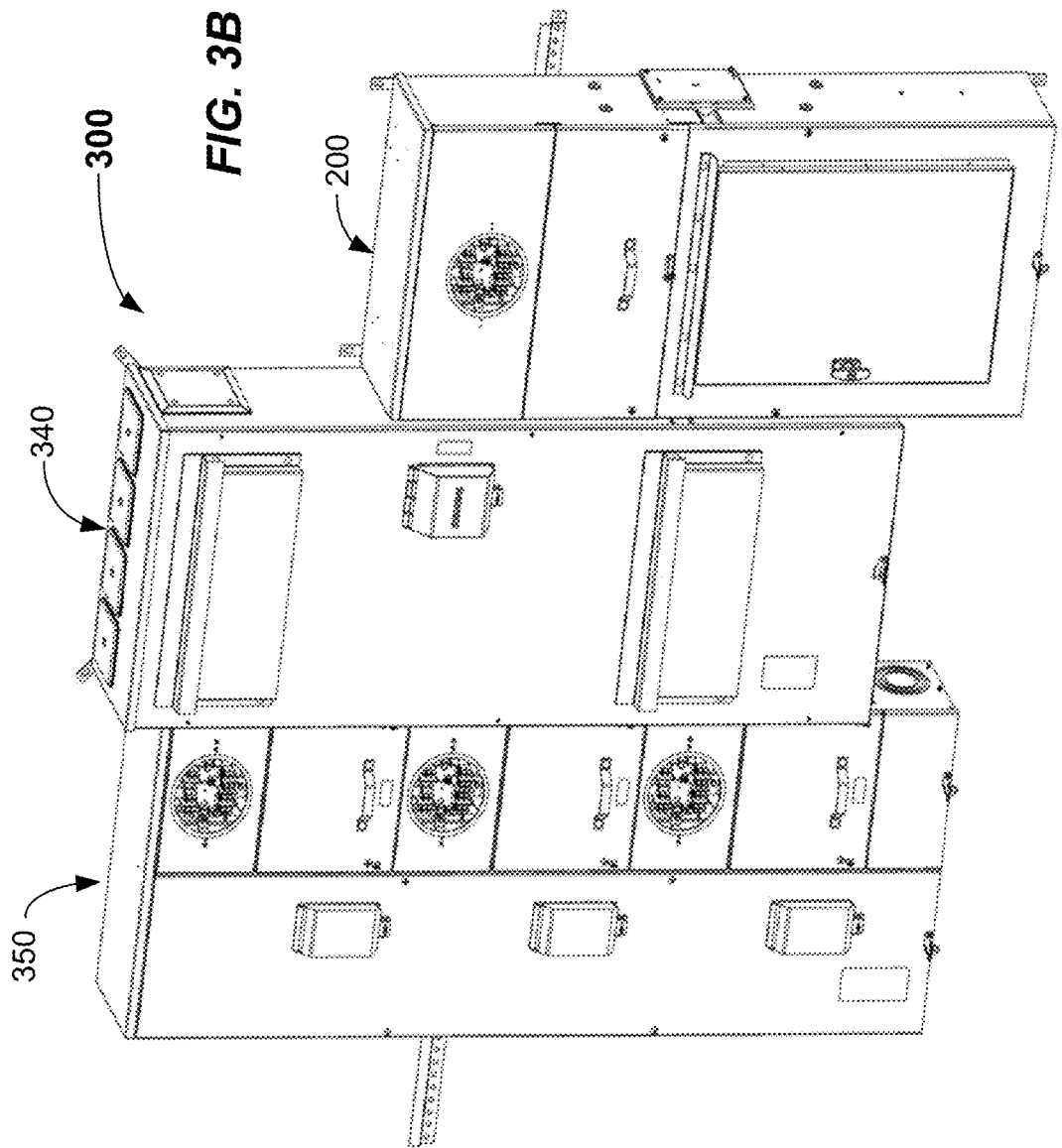
FIG. 3B illustrates a front isometric view of an electrical distribution system, with covers installed, having a meter socket, load center combination apparatus according to embodiments.

FIGS. 2A-2H illustrate embodiments of a meter socket, load center combination apparatus 200 that may be used within an electrical distribution system 300 (shown in FIGS. 3A and 3B). The meter socket, load center combination apparatus 200 may include an enclosure 202 (e.g., a metal box) that may include a back side 204, a first side 206 and a second side 208, and top side 209T and bottom side 209B. Covers 211A, 211B, and 211C and door 211D may be included on the front as part of the enclosure 202. One of the covers (e.g., 211A) may include a meter window 211M adapted to allow a utility meter (not shown) to be viewed with the cover 211A in a closed orientation. The enclosure components may be manufactured from bent rigid sheet material, such as sheet steel.

The enclosure sides, covers, and doors (e.g., back side 204, first side 206, second side 208, top side 209T, bottom side 209B, covers 211A, 211B, and 211C and door 211D) may form a meter socket section 210 and a load center section 215, located at a top and bottom, respectively. This orientation may be reversed in some embodiments. The meter socket section 210 has a meter socket 212 configured to receive a utility meter (not shown). The meter socket 212 may be a plug-on type, as is conventional. The load center section 215 has a panelboard 216 having a plurality of locations configured to receive one or more circuit interface devices. A circuit interface device may be any electrical device that protect an electrically coupled branch circuit such as a conventional circuit breaker, a device adapted to monitor a electrical circuit branch, such as a branch monitoring device (BMD), a surge protection device, an electrical switch, a lug kit, or the like.

Within the enclosure 202, a cross bus connection section 220 is provided. The cross bus connection section 220 extends laterally from the first side 206 to the second side 208 and provides an internal channel 222 into which one or more cross bus bars 224 may extend (See FIGS. 2E-2G). The cross bus connection section 220 may be located between the meter socket section 210 and the load center section 215, as shown. However, the cross bus connection section 220 may optionally be provided at the top or bottom of the enclosure 202. The cross bus connection section 220 has one or more first side openings 221, 223 configured and adapted to facilitate connection to the one or more cross bus bars 224. A cross bus housing 226 of the cross bus connection section 220 is configured to at least partially surround the one or more cross bus bars 224 received in an internal channel 222.

Cross bus housing 226 may be secured to the back side 204 of the housing 202 by suitable fasteners (e.g., screws) such that the cross bus bars 224 are entirely radially surrounded by a housing structure. Cross bus bars 224 are conductive bars adapted to carry electricity (e.g., A, B, and/or C phases of electricity). One or more of the cross bus bars 224 may function as an electrical neutral or ground. The cross bus bars 224 may have bar shape having a thickness greater than a width, and a length longer than both the width and thickness. The cross bus bars 224 may be constructed from a conductive material (e.g., copper) and received in one or more insulator supports 229 that are retained in the channel 222. In some embodiments, at least two spaced insulator supports 229 are used. The insulator supports 229 support the cross bus bars within the channel.

In one or more embodiments, two side openings 221, 223 are provided, a first opening 221 through the first side 206 and a second opening 223 through the second side 208. Removable side covers 221C and 223C may be secured over the openings 221, 223. The removable side covers 221C, 223C on one or more of the first side 206 and the second side 208 may be removable and configured to provide access into the internal channel 222 of the cross-bus connection section 220. In the depicted embodiment, the cross bus bars 224 act as one or more first cross bus bars that are configured and adapted connect to one or more second cross bus bars in another enclosure (e.g., in a main breaker unit—See FIG. 3A).

In the meter socket section 210, the meter socket 118 may be mounted to the back side 204, such as by fasteners (e.g., screws). Power to the line side terminals of the meter socket 212 may be carried by the cross bus bars 224. The meter socket 212 includes electrical contacts (e.g., clips) adapted to contact meter inputs and meter outputs and is adapted to receive and mount a conventional utility meter. Any suitable meter may be used.

In the load center section 215, the panelboard 216 may be mounted to the back side 204, such as by fasteners (e.g., screws). The meter socket, load center combination apparatus 200 may include conductor straps 234 that electrically couple between the panelboard 216 and the meter socket 212 through the main circuit breaker 225. The meter socket, load center combination apparatus 200 may also include a neutral strap 227 that couples between the panelboard 216 and the neutral cross bus 224. The panelboard 216 may also include a base 228 and a plurality of phase stabs (e.g., A, B and or C phase stabs) at staggered vertical locations. Each location is adapted to receive a conventional circuit interconnect device (e.g., circuit breaker, switch, BCM, surge protection device, or the like). The circuit interconnect devices (not shown) couple to the panelboard 216, at the various vertical locations and allow protection, monitoring, or switching of a plurality of electrical branches including electrical loads connected to the circuit interconnect devices. The base 228 may be manufactured from an insulator material (e.g., plastic) and be mounted to the back side 204 of the enclosure 202 by fasteners (e.g., screws). Any suitable construction of the panelboard 216 may be used.

The panelboard 216 may include, for example, a plurality of spaces/locations at which a plurality of circuit interconnect devices may be coupled. For example, in the depicted embodiment of FIG. 2O, the number of locations shown is about 24. The panelboard 216 may be used to service, protect, or monitor a plurality of electrical branch circuits including electrical loads (not shown). Other sizes and numbers of locations may be used, such as 6 space, 8 space, 10 space, 12 space, 16 space, 20 space, 30 space, or more, Not all locations need to include a circuit interconnect device.

The meter socket, load center combination apparatus 200 may include a main circuit breaker 225 electrically coupled between the meter socket 212 and the panelboard 216. In particular, the main circuit breaker 225 is electrically coupled between the load terminals of the meter socket 212 and the line terminals of the panelboard 216. The electrical connection may be factory installed using conductive straps. The main circuit breaker 225 may be operational to provide and shut off electrical power to the panelboard 216, and in particular to the bus bars (e.g., A and B or A, B, and C phase) within or mounted to the base 228 that are connectable to the circuit interface devices (not shown). The main circuit breaker 225 and optional auxiliary breaker 238 may be a single phase or three phase circuit breaker. The sum of the handle ratings may have a rating up to but not more than the maximum rating of the meter socket. In the depicted embodiment, the main circuit breaker is a 200 amp, 3-phase circuit breaker and the auxiliary breaker 238 is a 50 amp, 3-phase circuit breaker. Other types and ratings of main circuit breakers 225 and auxiliary breakers 238 may be used. As shown, the main circuit breaker 225 is mounted in front of the cross bus housing 226, and between the cross bus housing 226 and the cover 211C and door 211D. The handle of the main circuit breaker 225 is accessible through the door 211D, when the door 211D is opened.

Now referring to FIGS. 2E and 2H, the configuration and interconnection of various example components are shown. The meter socket, load center combination apparatus 200 may include a shield 230 that at least partially covers some portion of the one or more main breaker line conductor straps 232. The main breaker line conductor straps 232 electrically couple at the terminals of the main circuit breaker 225 to the load side of the meter socket 212. One or more main breaker load conductor straps 234 may electrically couple the main circuit breaker 225 to the panelboard 216. Each of the one or more main breaker load conductor straps 234 (e.g., one for each phase of electricity) may be electrically coupled to a respective phase bus bar of the panelboard 216.

In one or more embodiments, the line conductor straps 232 may be received through openings in the shield 230 and coupled to the meter socket 212. The openings may include an insulator member 233 having individual openings for receiving each line conductor straps 232 there through. The shield 230 may be physically coupled to the cross bus housing 226, such as on an upper side or front side thereof, or positioned adjacent thereto. The meter socket, load center combination 200 includes one or more cross bus conductor straps 236 electrically coupling the one or more cross bus bars 224 to the meter socket 212. The cross bus conductor straps 236 may pass through openings 226O formed in defined regions of a top wall of the cross bus housing 226.

As shown in FIG. 2D, the meter socket, load center combination apparatus 200 may include an auxiliary circuit breaker 238 coupled directly to the meter socket 212. The auxiliary circuit breaker 238 may be physically coupled and mounted in front of the cross bus housing 226 and located adjacent to the main circuit breaker 225.

An electrical distribution system 300 including the meter socket, load center combination apparatus 200 is shown in FIGS. 3A-3B. The meter socket, load center combination apparatus 200, as shown, is mounted directly adjacent to a second enclosure 341 of a second panel apparatus 340 such as a main breaker unit. The second panel apparatus 340 (e.g., main breaker unit) may include the main enclosure 341 housing a main service breaker 342 that receives electrical power from the utility, such as through wired electrical conduit connections 344 shown (e.g., main utility line). As can be seen in FIG. 3, the first cross bus bars 224 of the meter socket, load center combination apparatus 200 are directly electrically connected to second cross bus bars 345 at the first opening 221. In this embodiment, second opening 223 (FIGS. 2F-2G) is closed with cover 223C. The cross bus housing (e.g., cross bus housing 226) is not shown in FIG. 3 so that the connection through the first opening 221 and the spacing of the insulator supports 229 may be illustrated. A plurality of insulator supports 229 are shown. Insulator supports are described in US Patent Application Publication US2011/0083872 entitled "CROSSING BUS SUPPORT APPARATUS, CONNECTORS, SYSTEMS AND ASSEMBIES METHODS OF INSTALLING SAME," filed on Oct. 6, 2010, the disclosure of which is hereby incorporated by reference herein in its entirety.

The optional auxiliary breaker 238 may be a circuit breaker rated up to the rating of the main circuit breaker, 225, for example. The auxiliary breaker 238 may be rated at 15 A, 20 A, 30 A, 40 A, 60 A, 100 A, 125 A, for example. Other values may be used.

The utility power source may be a conventional public utility service provided at about 240V, for example. In some embodiments, the power service may be about 200 A. The utility power source may electrically couple to the main service breaker 342 that functions to connect/disconnect power from the second cross bus bars 345.

Coupled to the other side of the second panel apparatus 340 (e.g., the main breaker unit) may be a meter stack panel 350. The meter stack panel 350 also couples directly to the second cross bus bars 345 and received power therefrom. The connection between the cross bus bars may be as described in U.S. Pat. Nos. 3,104,276; 3,183,298; 3,909,098; and 5,466,889, the disclosures of which are hereby incorporated by reference herein in their entirety.

Figure 4:
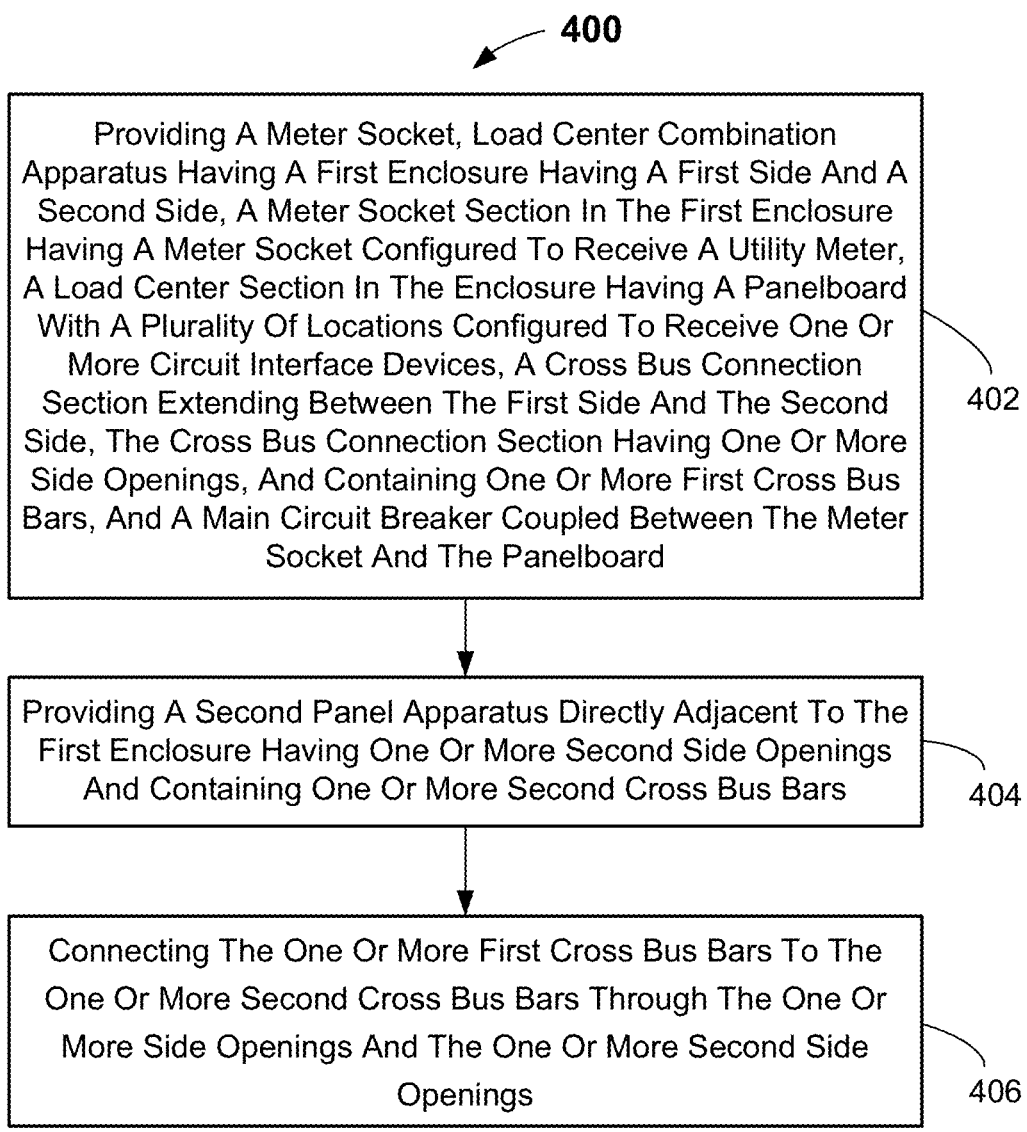
FIG. 4 is a flowchart of a method of assembling an electrical distribution system according to embodiments.

A method of method of assembling a power distribution system (e.g., power distribution system 300) will now be described with reference to FIG. 4. The method 400 includes, in 502, providing a meter socket, load center combination apparatus (e.g., meter socket, load center combination apparatus 200) having a first enclosure (e.g., enclosure 202) having a first side (e.g., first side 206) and a second side (e.g., first side 208), a meter socket section (e.g., meter socket section 210) in the first enclosure having a meter socket (e.g., meter socket 212) configured to receive a utility meter, a load center section (e.g., load center section 215) in the enclosure having a panelboard (e.g., panelboard 216) with a plurality of locations configured to receive one or more circuit interface devices, a cross bus connection section (e.g., cross bus connection section 220) extending between the first side and the second side, the cross bus connection section having one or more side openings (e.g., side openings 221, 223), and containing one or more first cross bus bars (e.g., cross bus bars 224), and a main circuit breaker coupled between the meter socket and the panelboard. The method 400 further includes, in 404, providing a second panel apparatus (e.g., second panel apparatus 340) directly adjacent to the first enclosure having one or more second side openings (e.g., second side openings 321), and containing one or more second cross bus bars (e.g., second bus bars 345), and, in 406, connecting the one or more first cross bus bars to the one or more second cross bus bars through the one or more side openings and the one or more second side openings. As should be appreciated, the meter socket, load center combination apparatus 200 may be attached onto the other side of the second panel apparatus 340, and may be attached to other types of panel apparatus. For example, a second panel apparatus may comprise another meter socket, load center combination apparatus 200 in some embodiments.

It should be readily appreciated by those persons of ordinary skill in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular apparatus, systems and/or methods disclosed, but, to the contrary, the intention is to cover all modifications, equivalents, and alternatives falling within the scope of the invention.

What is claimed is:

1. A meter socket, load center combination apparatus, comprising:
    an enclosure having a back side, a first side, and a second side;
    a meter socket section having a meter socket configured to receive a utility meter;
    a load center section having a panelboard with a plurality of locations configured to receive one or more circuit interface devices;
    a cross-bus connection section extending between the first and second sides and located between the meter socket section and the load center section, the cross bus connection section surrounding one or more cross bus bars and having one or more side openings configured to allow electrical connection to the one or more cross bus bars; and
    a main circuit breaker coupled between the panelboard and the meter socket,
    wherein the main circuit breaker is mounted in front of the cross bus housing.

2. The meter socket, load center combination apparatus of claim 1, wherein the circuit interface devices comprise one or more of the following:
    circuit breaker,
    electrical switch,
    branch monitoring device,
    surge protection device and
    lug kit.

3. The meter socket, load center combination apparatus of claim 1, further comprising removable opening covers on one or more of the first side and the second side configured to provide access into an internal channel of the cross-bus connection section.

4. The meter socket, load center combination apparatus of claim 1, wherein the cross bus connection section comprises a cross bus housing configured to surround the one or more cross bus bars.

5. The meter socket, load center combination apparatus of claim 1, comprising one or more line conductor straps electrically coupled to the main circuit breaker and the meter socket.

6. The meter socket, load center combination apparatus of claim 1, comprising one or more main breaker load conductor straps coupled to the main circuit breaker and the panelboard.

7. The meter socket, load center combination apparatus of claim 1, comprising one or more cross bus conductor straps coupled to the one or more cross buses and the meter socket.

8. The meter socket, load center combination apparatus of claim 1, comprising an auxiliary circuit breaker coupled directly to the meter socket.

9. The meter socket, load center combination apparatus of claim 4, wherein the main circuit breaker is mounted in front of the cross bus housing.

10. The meter socket, load center combination apparatus of claim 8, wherein the auxiliary circuit breaker is mounted in front of the cross bus housing.

11. The meter socket, load center combination apparatus of claim 8, comprising one or more cross buses received in the cross bus housing.

12. The meter socket, load center combination apparatus of claim 9, further comprising a shield coupled to the cross bus housing and one or more line conductor straps received through the shield and coupled to the meter socket.

13. An electrical distribution system, comprising:
    a meter socket, load center combination apparatus having an enclosure having a back side, first side, and a second side,
    a meter socket section having a meter socket configured to receive a utility meter,
    a load center section having a panelboard with a plurality of locations configured to receive circuit interface devices,
    a cross-bus connection section extending between the first side and the second side, the cross bus connection section having one or more side openings, and containing one or more first cross bus bars, wherein the cross bus connection section comprises a cross bus housing configured to surround the one or more first cross bus bars, and a main circuit breaker coupled between the meter socket and the panelboard, wherein the main circuit breaker is mounted in front of the cross bus housing; and a second panel apparatus having one or more second side openings and containing one or more second cross bus bars, wherein the one or more first cross bus bars connect to the one or more second cross bus bars through the one or more side openings of the cross bus connection section and the one or more second side openings of the second panel apparatus.

14. The meter socket, load center combination apparatus of claim 13, wherein the cross bus connection section is located between the meter socket section and the load center section.

15. The electrical distribution system of claim 13, wherein the second panel apparatus comprises a main circuit breaker panel.

16. A method of assembling a power distribution system, comprising:

providing a meter socket, load center combination apparatus having a first enclosure having a first side and a second side, a meter socket section in the first enclosure having a meter socket configured to receive a utility meter, a load center section in the enclosure having a panelboard with a plurality of locations configured to receive one or more circuit interface devices, a cross bus connection section extending between the first side and the second side, the cross bus connection section having one or more side openings, and containing one or more first cross bus bars, and a main circuit breaker coupled between the meter socket and the panelboard, wherein the cross bus connection section comprises a cross bus housing configured to surround the one or more cross bus bars, and wherein the main circuit breaker is mounted in front of the cross bus housing, wherein the cross-bus connection section is located between the meter socket section and the load center section;

providing a second panel apparatus directly adjacent to the first enclosure having one or more second side openings and containing one or more second cross bus bars, wherein the second panel apparatus comprises a second cross bus housing configured to surround the one or more second cross bus bars; and connecting the one or more first cross bus bars to the one or more second cross bus bars through the one or more side openings and the one or more second side openings.

17. The method of claim 16, wherein the second panel apparatus comprises a main circuit breaker unit.

18. The method of claim 16, comprising coupling an auxiliary breaker to the meter socket.

19. The method of claim 16, comprising coupling a meter stack panel to the second panel apparatus.

* * * * *